US007610250B2

(12) United States Patent
Kisacanin et al.

(10) Patent No.: US 7,610,250 B2
(45) Date of Patent: Oct. 27, 2009

(54) REAL-TIME METHOD OF DETERMINING EYE CLOSURE STATE USING OFF-LINE ADABOOST-OVER-GENETIC PROGRAMMING

(75) Inventors: Branislav Kisacanin, Kokomo, IN (US); Eric Yoder, Frankfort, IN (US)

(73) Assignee: Delphi Technologies, Inc., Troy, MI (US)

( * ) Notice: Subject to any disclaimer, the term of this patent is extended or adjusted under 35 U.S.C. 154(b) by 432 days.

(21) Appl. No.: 11/527,907

(22) Filed: Sep. 27, 2006

(65) Prior Publication Data

US 2008/0126281 A1 May 29, 2008

(51) Int. Cl.
*G06N 3/12* (2006.01)
(52) U.S. Cl. .............................. 706/13; 706/12; 706/14; 706/20
(58) Field of Classification Search ............. 706/12–14, 706/20; 382/128, 155–159, 181, 190, 224
See application file for complete search history.

(56) References Cited

U.S. PATENT DOCUMENTS

| 4,697,242 | A | 9/1987 | Holland et al. | |
|---|---|---|---|---|
| 4,881,178 | A | 11/1989 | Holland et al. | |
| 6,272,479 | B1 * | 8/2001 | Farry et al. | 706/13 |
| 6,532,453 | B1 | 3/2003 | Koza et al. | |
| 7,016,881 | B2 * | 3/2006 | Li et al. | 706/12 |
| 7,020,337 | B2 | 3/2006 | Viola et al. | |
| 7,031,499 | B2 | 4/2006 | Viola et al. | |
| 7,099,510 | B2 | 8/2006 | Jones et al. | |
| 7,139,738 | B2 * | 11/2006 | Philomin et al. | 706/14 |
| 2003/0007687 | A1 * | 1/2003 | Nesterov et al. | 382/167 |
| 2003/0110147 | A1 * | 6/2003 | Li et al. | 706/1 |
| 2004/0240747 | A1 * | 12/2004 | Jarman et al. | 382/274 |
| 2006/0011399 | A1 | 1/2006 | Brockway et al. | |
| 2007/0127781 | A1 * | 6/2007 | Stewart | 382/110 |

OTHER PUBLICATIONS

Skarbek et al. "Image Object Localization by AdaBoost Classifier", 2004, pp. 511-518.*
Viola et al. "Rapid Object Detection Using a Boosted Cascade of Simple Features", IEEE, 2001, pp. I-511-I-518.*
Hansen et al. "Boosting Particle Filter-Based Eye Tracker Performance Through Adapted Likelihood Function to Reflexions and Light Changes", IEEE, 2005, pp. 111-116.*
Tani et al. "Detecting of One's Eye from Facial Image by Using Genetic Algorithm", IEEE, 2001, pp. 1937-1940.*
Yen et al. "Facial Feature Extraction Using Genetic Algorithm", IEEE, 2002, pp. 1895-1900.*
Treptow et al. "Combining AdaBoost Learning and Evolutionary Search to Select Features fpr Real Time Object Detection", IEEE, 2004, pp. 2107-2113.*
Viola, Jones, Rapid Object Detection Using a Boosted Cascade of Simple Features, CVPR 2001.
Tackett, Genetic Programming for Feature Discovery and Image Discrimination, Proc. 5th Int'l Conf. on Genetic Algorithms, ICGA-93, pp. 303-309, 1993.

(Continued)

*Primary Examiner*—David R Vincent
*Assistant Examiner*—Omar F Fernandez Rivas
(74) *Attorney, Agent, or Firm*—Jimmy L. Funke

(57) ABSTRACT

Real-time video images of a human subject's face are processed by a plurality of classification algorithms developed in an off-line training process to determine the open vs. closed eye state of the subject. The off-line training process utilizes a genetic programming loop embedded within an adaptive boosting loop, and forms the classification algorithms and weighting factors for combining their classification scores. In the real-time process, the individual classification scores are combined and compared to a threshold to determine the open vs. closed eye state.

4 Claims, 2 Drawing Sheets

OTHER PUBLICATIONS

EP Search Report dated Dec. 20, 2007.
Hideaki Tani et al: "Detecting of one's eye from facial image by using genetic algorithm" IECON'01. Proceedings of the 27$^{th}$. Annual Conference of the IEEE Industrial Electronics Society. Denver, CO, Nov. 29-Dec. 2, 2001, Annual Conference of the IEEE Industrial Electronics Society, New York, NY : IEEE, US, vol. vol. 1 of 3. Conf. 27, Nov. 29, 2001, pp. 1937-1940, XP010571712 ISBN: 0-7803-7108-9.

Zhichao Tian et al: "Real-time driver's eye state detection" Vehicular Electronics and Safety, 2005. IEEE International Conference on XI'An, China Oct. 14-16, 2005, Piscataway, NJ, USA, IEEE, Oct. 14, 2005, pp. 285-289, XP010867288 ISBN: 0-7803-9435-6.

\* cited by examiner

REAL-TIME METHOD OF DETERMINING EYE CLOSURE STATE USING OFF-LINE ADABOOST-OVER-GENETIC PROGRAMMING

TECHNICAL FIELD

The present invention relates to a method of processing video image data to determine the open vs. closed eye state of a human subject.

BACKGROUND OF THE INVENTION

Vision-based driver monitoring systems capture a video image of the driver's face, and process the image to detect and track the driver's eyes in order to assess drive gaze or drowsiness. See, for example, the U.S. Pat. Nos. 5,795,306; 5,878,156; 5,926,251; 6,097,295; 6,130,617; 6,243,015; 6,304,187; and 6,571,002, incorporated herein by reference. A key indicator for assessing driver drowsiness is the pattern of eye closure, and various techniques have been devised for classifying the open vs. closed state of the driver's eye. One approach for determining eye state is to train a classification algorithm or network using training examples depicting a variety of human subjects imaged under varying conditions. When the classifier correctly classifies the eye state for all of the training examples, it can be used to accurately classify the eye state of other similar test examples. However, the eye state characteristics of a video image can be relatively complex, and it is difficult to develop an easily implemented classifier that is capable of high accuracy. A neural network or support vector machine can be used to achieve the required classification accuracy, but such classifiers are relatively complex and require substantial processing capability and memory, which tends to limit their usage in cost-sensitive applications.

It has been demonstrated that genetic programming principles can be used to develop reasonably accurate classifiers that are less costly to implement than neural network classifiers. Genetic programming uses certain features of biological evolution to automatically construct classifier programs from a defined set of possible arithmetic and logical functions. The constructed classifier programs are used to solve numerous training examples, and performance metrics (fitness measures) are used to rate the classification accuracy. The most accurate programs are retained, and then subjected to genetic alteration in a further stage of learning. The objective is to discover a single program that provides the best classification accuracy, and then to use that program as a classifier. Detailed descriptions of genetic algorithms and genetic programming are given in the publications of John H. Holland and John R. Koza, incorporated herein by reference. See in particular: *Adaptation in Artificial and Natural Systems* (1975) by Holland; and *Genetic Programming: On the Programming of Computers by Means of Natural Selection* (1992) and *Genetic Programming II: Automatic Discovery of Reusable Programs* (1994) by Koza.

Another less complex alternative to neural networks, known generally as ensemble learning, involves training a number of individual classifiers and combining their outputs. A particularly useful ensemble learning technique known as AdaBoost (adaptive boosting) adaptively influences the selection of training examples in a way that improves the weakest classifiers. Specifically, the training examples are weighted for each classifier so that training examples that are erroneously classified by a given classifier are more likely to be selected for further training than examples that were correctly classified.

SUMMARY OF THE INVENTION

The present invention is directed to an improved method of processing real-time video image data to determine the open vs. closed eye state of a human subject based on both genetic programming and adaptive boosting. The video image data is characterized and processed by a plurality of classification algorithms developed in an off-line training process that utilizes both genetic programming and adaptive boosting. In the off-line process, a genetic programming loop is embedded within an adaptive boosting loop to develop the classification algorithms and weighting factors for combining their classification scores. The combined classification score is compared to a threshold to determine the open vs. closed eye state.

DESCRIPTION OF THE PREFERRED EMBODIMENT

Figure 1:
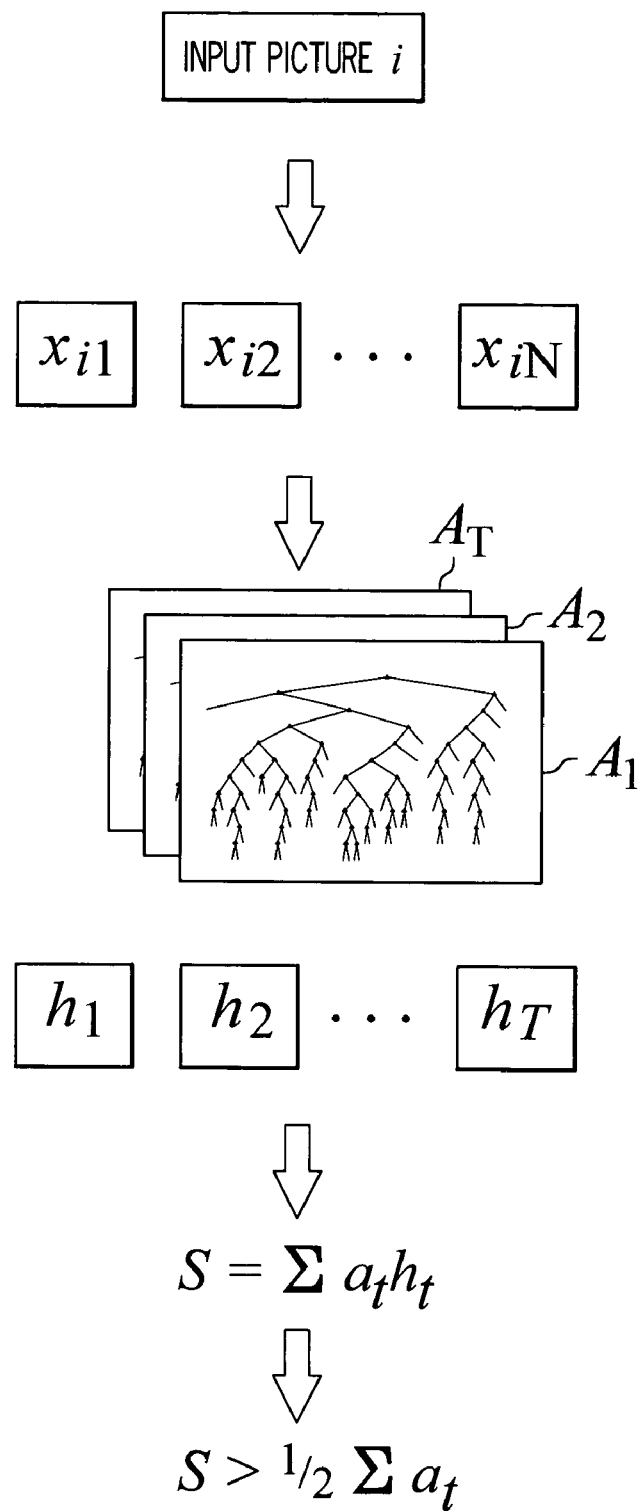
FIG. 1 is a diagram of a real-time process for processing video image data with a plurality of classification algorithms to determine the open vs. closed eye state of a human subject according to this invention.

The diagram of FIG. 1 illustrates a method according to the present invention for processing video images of a human subject to characterize the subject's open vs. closed eye state. The method is illustrated as a series of steps carried out by a programmed microprocessor-based controller as part of a real-time driver monitor system. However, it will be understood that the illustrated process can be used in other applications as well.

Figure 2:
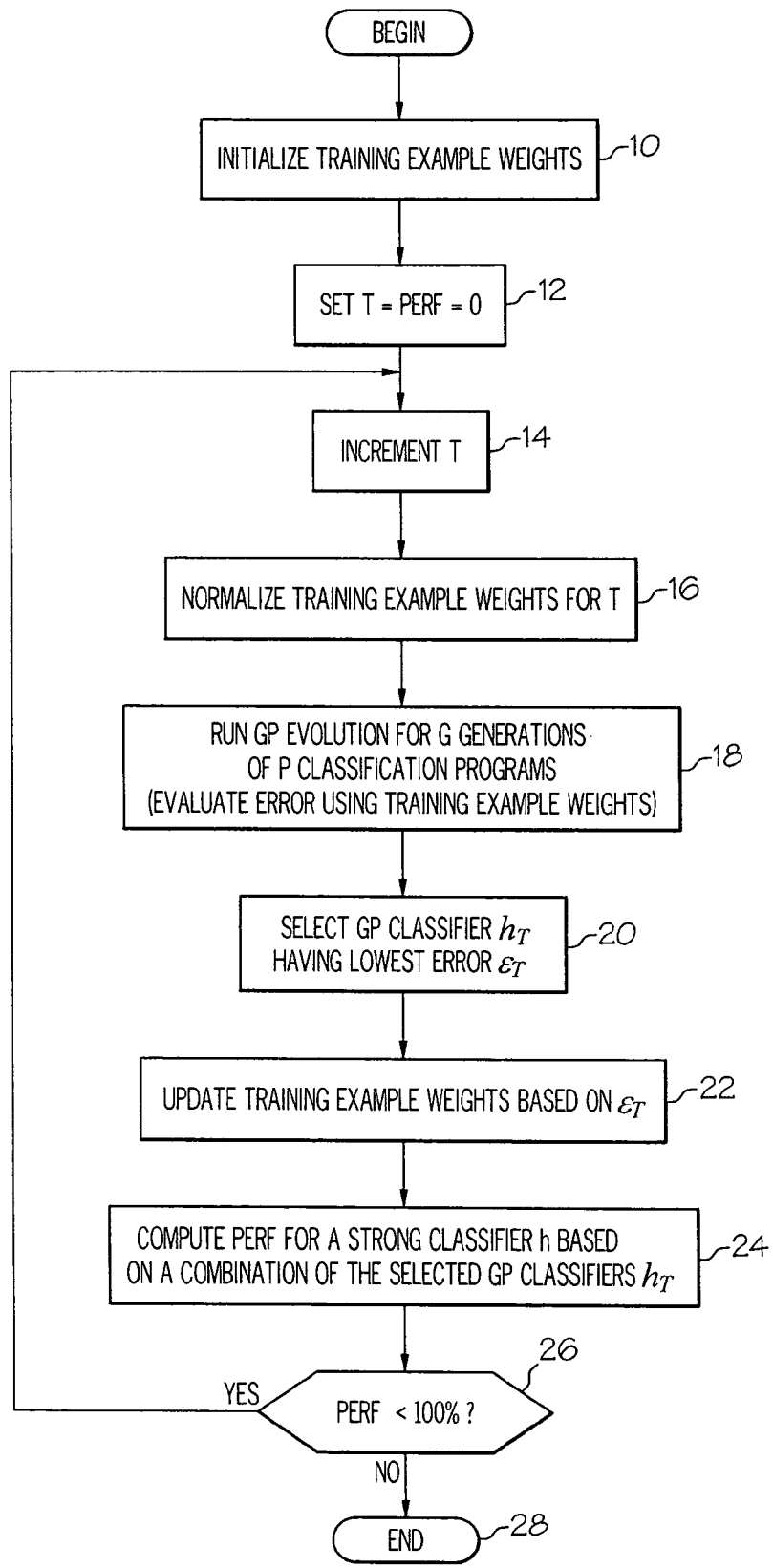
FIG. 2 is a flow diagram illustrating an off-line process for developing the classification algorithms for the real-time process of FIG. 1.

Referring to FIG. 1, the process input is a video image or a series of video images of a human subject's face. Each input image or picture i is characterized using one or more known techniques to form a feature vector comprising elements $x_{i1} \ldots x_{iN}$. For example, the vector elements can be over-complete Haar wavelet coefficients, or sum-of-absolute difference (SAD) values between the input image and a prior image frame. In any event, the feature vector of the input image is applied as an input to each of a plurality of genetically produced classifier algorithms $A_1 \ldots A_T$, depicted in FIG. 1 as parse trees. The number of classifier algorithms can vary depending on the application; by way of example, one implementation of the illustrated process utilized seventeen (17) classifier algorithms. Classifier algorithms $A_1 \ldots A_T$ are developed using an off-line process, described below in reference to FIG. 2. Each classifier algorithms $A_1 \ldots A_T$ produces a classification score $h_1 \ldots h_T$ representing the likelihood that the driver's eye is closed (or open). For example, the score may range from zero (0) to one-hundred (100), where zero indicates a high confidence that the eye is open, and one-hundred indicates a high confidence that the eye is closed. The classification scores $h_1 \ldots h_T$ are combined to form an overall score S as follows:

$$S = \Sigma(\alpha_t h_t) \text{ for } t=1 \ldots T \quad (1)$$

where $\alpha_1 \ldots \alpha_T$ are weight terms also determined by the off-line process of FIG. 2. Finally, the overall score S is compared to a threshold such as ($\frac{1}{2}\Sigma\alpha_t$). If the overall score S exceeds the threshold, the subject's eye state is deemed to be closed; otherwise, the eye state is deemed to be open.

As indicated above, the classifier algorithms $A_1 \ldots A_T$ and the weights $\alpha_1 \ldots \alpha_T$ are developed off-line using the process illustrated in FIG. 2. The input to the process of FIG. 2 is a series of training examples characterized as shown in FIG. 1 and coupled with a label indicating the classification result as determined by a human expert. That is, each training example is a video image of a driver's face, and each such example is characterized as a Haar wavelet feature vector (i.e., an array of wavelet coefficients or elements) and the associated label indicating whether the correct classification. For purposes of the illustration, M training examples are represented by the pairs $(x_1, y_1) \ldots (x_M, y_M)$, where each $x_i$ is a feature vector consisting of N elements, and each $y_i$ is a binary classification result. For example, the classification result $y_i$ can be zero (0) for training examples for which the subject's eye is not closed, and one (1) for training examples for which the subject's eye is closed. Each training example has an associated weight w and those weights are initialized at block 10 as follows:

$$\text{Initialize weights } w_{1,i} = \begin{cases} \frac{1}{2l} & \text{for } y_i = 0 \\ \frac{1}{2m} & \text{for } y_i = 1 \end{cases} \quad (2)$$

where m is the number of positive training examples, and l is the number of negative training examples. The first subscript of weight w identifies the iteration number of the routine, while the second subscript identifies the training example. The block 12 is also executed to initialize the values of an iteration counter T and a performance metric PERF.

The blocks 14-24 represent a single iteration of a classifier development routine according to this invention. In each iteration, one genetically programmed (GP) classifier is selected, and the performance metric PERF is computed for a strong classifier based on the selected GP classifier and all GP classifiers selected in previous iterations of the routine. If the strong classifier correctly classifies all of the training examples, PERF will have a value of 100%, and the process will be ended as indicated by blocks 26-28. If the strong classifier incorrectly classifies at least one of the training examples, PERF will be less than 100%, and the blocks 14-24 will be re-executed to develop an additional GP classifier. Although not indicated in FIG. 2, the process may alternatively be exited if PERF reaches a threshold other than 100%, or if a specified number of iterations have occurred. On each iteration of the routine, the training example weights are updated to give more weight to those training examples that were incorrectly classified by the selected GP classifier, and the updated weights are used to evaluate the fitness of GP classifiers produced in the next iteration of the routine.

At the beginning of each iteration, block 14 increments the iteration counter T, and block 16 normalizes the training example weights based on the count value as follows:

$$w_{T,i} \leftarrow \frac{w_{T,i}}{\sum_{k=1}^{M} w_{T,k}} \quad (\text{for } i = 1 \ldots M) \quad (3)$$

so that $w_T$ is a probability distribution.

The block 18 is then executed to carry out a genetic programming process in which a number P of GP trees, each of depth D, are initialized and allowed to evolve over G generations. In a typical application, both P and G may be approximately three-hundred (300), and D may have a value of 3-5 in order to reduce the classifier complexity. Preferably, each GP tree comprises primitive arithmetic functions and logical operators such as +, −, MIN, MAX, and IF. Standard genetic operators including reproduction, cross-over and mutation are used for the program tree evolution. Each genetically developed classifier is applied to all of the training examples, and the classification error $\epsilon_j$ of a given GP classifier $h_j$ is computed as follows:

$$\varepsilon_j = \sum_i w_i |h_j(x_i) - y_i| \quad (4)$$

where $h_j(x_i)$ is the output of GP classifier $h_j$ for the feature vector $x_i$ of a given training example, $y_i$ is the correct classification result, and $w_i$ is the normalized weight for that training example. Of course, the fitness or accuracy of the GP classifier $h_j$ is inversely related to its classification error $\epsilon_j$.

When the genetic programming loop signified by block 18 is completed, the block 20 selects the best GP classifier $h_T$ for the current iteration T. This is the classifier having the lowest classification error $\epsilon_T$. Block 22 then updates the training example weights for the next iteration as follows:

$$w_{T+1,i} = w_{T,i} \beta^{1-e_i}, \text{ with} \quad (5)$$

$$\beta_T = \frac{\varepsilon_T}{1 - \varepsilon_T} \quad (6)$$

where the exponent $(1-e_i)$ is one when the training example $(x_i, y_i)$ is classified correctly, and zero when classified incorrectly. Consequently, the updated weight $w_{T+1}$ for a given training example is unchanged if the selected classifier $h_T$ classifies that training example incorrectly. Since the classification error $\epsilon_T$ will have a value of less than 0.5 (simple chance), the term $\beta_T$ is less than one; consequently, the updated weight $w_{T+1}$ for a given training example is decreased if the selected GP classifier $h_T$ classifies that training example correctly. Thus, the weight of a training example that is incorrectly classified is effectively increased relative to the weight of a training example that is correctly classified. In the next iteration of the routine, the classification error $\epsilon_T$ will be calculated with the updated training example weights to give increased emphasis to training examples that were incorrectly classified by the selected GP classifier $h_T$.

The block 24 evaluates the performance PERF of a strong classifier h based on a combination of the selected GP classifiers $h_t$ (i.e., the currently selected GP classifier $h_T$ and the GP classifiers selected in previous iterations of the routine). The strong classifier h has the same form as equation (1), except in this case, it is applied to the training examples. The output h(x) of the strong classifier h is defined as follows:

$$h(x) = \begin{cases} 1 & \sum_t \alpha_t h_t(x) \geq \frac{1}{2} \sum_t \alpha_t \\ 0 & \text{otherwise} \end{cases} \quad (7)$$

where $\alpha_t$ is a weight associated with a selected classifier $h_t$. The weight $\alpha_t$ is determined as a function of the above-defined term $\beta_t$ as follows:

$$\alpha_t = \log\frac{1}{\beta_t} \quad (8)$$

As a result, the weight $\alpha_t$ for a selected classifier $h_t$ varies in inverse relation to its classification error $\epsilon_T$. The strong classifier output h(x) is determined for each of the training examples, and the performance metric PERF is computed as follows:

$$PERF = 1 - \frac{\sum_{i=1}^{M}|h(x_i)-y_i|}{M} \quad (9)$$

If the strong classifier h produces the correct result for all of the training examples, PERF will have a value of one (100%); block 28 will be answered in the negative to end the classifier development process. If the strong classifier incorrectly classifies one or more of the training examples, PERF will be less than one, and the blocks 14-24 will be re-executed to carry out another iteration of the routine. Additional iterations of the routine can be added after 100% performance is achieved, but a validation set is required. And as indicated above, the process may alternatively be exited if PERF reaches a threshold other than 100%, or if a specified number of iterations of the process have occurred.

When the above-described off-line classifier development process is complete, the strong classifier represented by equation (7), including each of the selected GP classifiers $h_t$ and their associated weights $\alpha_t$, is implemented in a microprocessor-based controller and used to classify real-time video images as described above in reference to FIG. 1. Classification accuracy of at least 95% has been achieved in this manner for a variety of different applications.

In summary, the method of the present invention utilizes embedded genetic programming within an off-line adaptive boosting loop to develop a plurality of classifier algorithms that are combined in a real-time process to evaluate the open vs. closed eye state of a human subject. The classification accuracy is on a par with classifiers using neural networks and vector support machines, but requires significantly less computational capability and memory. Accordingly, the cost of hardware to implement an eye-state classifier according to this invention is significantly reduced for a given classification accuracy.

While the present invention has been described with respect to the illustrated embodiment, it is recognized that numerous modifications and variations in addition to those mentioned herein will occur to those skilled in the art. Accordingly, it is intended that the invention not be limited to the disclosed embodiment, but that it have the full scope permitted by the language of the following claims.

The invention claimed is:

1. A method of determining an open vs. closed state of an eye of a human subject, the method comprising the steps of:
   (a) forming training examples based on training images of human eyes, each training example including a feature vector characterizing a respective training image and a desired open vs. closed state of the human eye in that training image;
   (b) producing a prescribed number of classification programs, each of which is configured to evaluate a feature vector characterizing an image of a human eye and generate an eye state output corresponding to an open vs. closed state of the imaged eye;
   (c) performing a genetic programming process in which the produced classification programs are genetically modified over a prescribed number of generations;
   (d) applying the training examples to each of the genetically modified classification programs to produce a plurality of eye state outputs, determining deviations of the produced eye state outputs from the desired open vs. closed eye states of the training examples, and accumulating the determined deviations to form a classification error for each of the genetically modified classification programs;
   (e) selecting and saving the genetically modified classification program whose classification error is smallest;
   (f) repeating steps (c), (d) and (e) one or more times to form a set of saved genetically modified classification programs;
   (g) storing the set of saved genetically modified classification programs in a vision-based monitoring system including a microprocessor-based controller;
   (h) using the vision-based monitoring system to obtain a real-time video image of the human subject's eye and processing said real-time video image with said controller to generate a non-training feature vector characterizing said video image;
   (i) applying the non-training feature vector to each of the genetically modified classification programs stored in the vision-based monitoring system and collecting the eye state outputs generated by the classification programs;
   (j) combining the collected eye state outputs to determine an open vs. closed state of said human subject's eye; and
   (k) outputting the determined open vs. closed state from said controller.

2. The method of claim 1, including the steps of:
   assigning a training example weight to each training example;
   in step (d), applying the assigned training example weights to the determined deviations before accumulating the determined deviations to form the classification error; and
   in step (e), updating the assigned training example weights based on the classification error of the selected genetically modified classification program in a manner to give increased weight to training examples that were incorrectly classified by the selected genetically modified classification program.

3. The method of claim 1, including the steps of:
   calculating a program weight for each saved genetically modified classification program that varies in inverse relation to the classification error of that program; and
   in step (j), applying the calculated program weights to the collected eye state outputs before combining the collected eye state outputs to determine the open vs. closed eye state of said human subject's eye.

4. A method of determining an open vs. closed state of an eye of a human subject, the method comprising the steps of:
   (a) using a vision-based monitoring system to obtain a real-time video image of the human subject's eye and processing said real-time video image with a microprocessor-based controller to generate a feature vector characterizing said real-time video image;

(b) individually applying the feature vector to each of a plurality of genetically modified classification programs stored in said microprocessor-based controller to produce a plurality of open vs. closed eye state outputs, where the stored classification programs are developed by:

(i) forming training examples based on training images of human eyes, each training example including a feature vector characterizing a respective training image and a desired open vs. closed state of the human eye in that training image;

(ii) producing a prescribed number of classification programs, each of which is configured to evaluate a feature vector characterizing an image of a human eye and generate an eye state output corresponding to an open vs. closed state of the imaged eye;

(iii) performing a genetic programming process in which the produced classification programs are genetically modified over a prescribed number of generations;

(iv) applying the training examples to each of the genetically modified classification programs, and determining a classification error for each genetically modified classification program based on a deviation of its eye state outputs from the desired open vs. closed eye states of the training examples;

(v) selecting and saving the genetically modified classification program whose classification error is smallest;

(vi) repeating steps (iii), (iv) and (v) one or more times to form a set of saved genetically modified classification programs;

(vii) storing the saved genetically modified classification programs in said microprocessor-based controller, and (c) combining said plurality of open vs. closed eye state outputs to determine the open vs. closed state of the human subject's eye; and (d) outputting the determined open vs. closed state from said controller.

* * * * *